No. 805,306. PATENTED NOV. 21, 1905.
A. LIEBER.
AIR FILTER.
APPLICATION FILED DEC. 5, 1904.
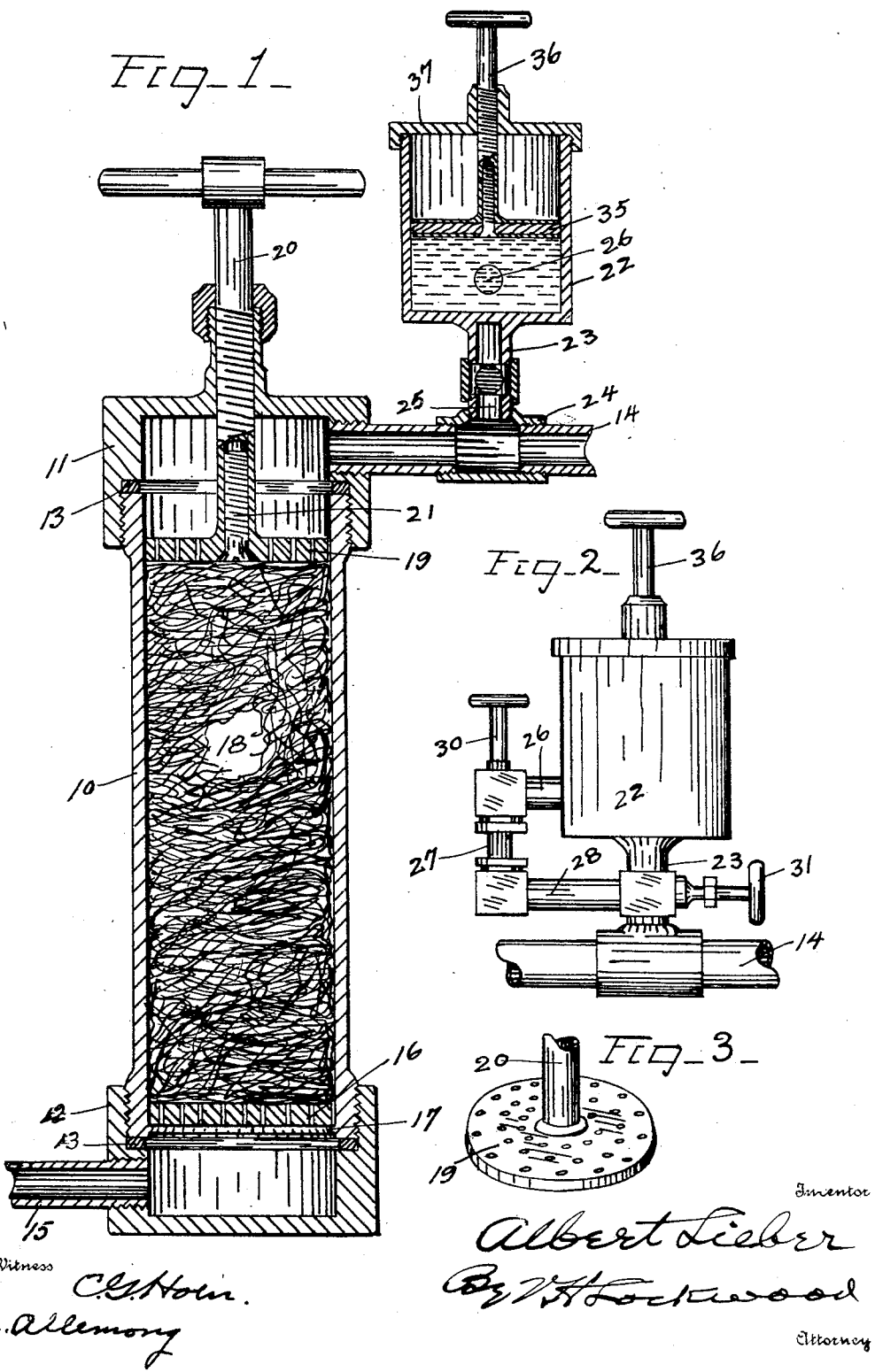

UNITED STATES PATENT OFFICE.

ALBERT LIEBER, OF INDIANAPOLIS, INDIANA.

AIR-FILTER.

No. 805,306.  Specification of Letters Patent.  Patented Nov. 21, 1905.

Application filed December 5, 1904. Serial No. 235,552.

*To all whom it may concern:*

Be it known that I, ALBERT LIEBER, of Indianapolis, county of Marion, and State of Indiana, have invented a certain new and useful Air-Filter; and I do hereby declare that the following is a full, clear, and exact description thereof, reference being had to the accompanying drawings, in which like numerals refer to like parts.

This invention relates to improvements in air-filters of the kind set forth in my application, Serial No. 232,045, filed November 9, 1904.

The chief feature of this invention consists of means for compressing the cotton or filtering material to the degree best suited for the chemical through which the air passed through the device is being treated.

The purpose of the invention, therefore, is to more thoroughly arrest the bacteria and germs of the air in the filter before the same passes through the filter. I have used it for pitching the interior of beer-kegs, the air being passed through the filter and compressed for blowing and spreading warm pitch upon the internal surface of the keg. This device prevents the bacteria and germs from the air entering the pitch.

The nature of the invention will be understood from the accompanying drawings and the following description and claim.

In the drawings, Figure 1 is a central vertical section of the filter. Fig. 2 is a side elevation of the means for charging the filter with chemicals. Fig. 3 is a perspective view of a perforated disk.

In detail a suitable casing 10, cylindrical in form, is provided, screw-threaded at each end externally. Caps 11 and 12 are provided with internal threads to screw upon the ends of said tube, gaskets 13 lying between. The cap 11 is provided with an inlet-tube 14, and the cap 12 is provided with an outlet-tube 15. Within the main chamber of the filter there is a perforated disk 16, mounted stationary in the bottom by means of a lip or flange 17, and upon this cotton 18 is placed, filling the tube 10. In the upper part of the tube there is a movable perforated disk 19, secured to the large externally-extending screw 20 by means of a small screw 21. The externally-extending screw 20 has an air-tight bearing, so that it can be actuated without the escape of air from within the filter. It is obvious from this explanation that the screw 20 may be operated to depress the cotton in the filter after the filter has been filled, and thereby tend more and more to bring the meshes of the cotton closer together, and thus to filter more effectually the air that passes through it.

Compressed air from any suitable source is forced into the filter through the tube 14 and some chemical discharged into said tube, so that they mingle in the chamber of the filter above the upper perforated disk and then pass through the cotton filtering. The chemical is supplied from a chemical vessel 22, supported upon a stem 23, that is secured by a sleeve 24 in connection with the tube 14 over an opening 25 into said tube. The lower part of the stem 23 is tubular, and into it a by-pass enters from the chemical vessel 22, this by-pass being through the tubes 26, 27, and 28. A valve 30 regulates the admission of the chemical from the tube 26 to the tube 27, and the valve 31 regulates the admission of the chemical to the air-inlet tube 14. While the passage of the air through the tube 14 will tend to draw the chemical by suction down into said tube 14, there is provided as a further means of regulation the compressing-disk 35 within the vessel 22, that is actuated by the screw 36, which operates through the removable cap 37.

What I claim as my invention, and desire to secure by Letters Patent, is—

An air-filter including a casing, an outlet-pipe at one end, a perforated disk near said outlet end, a movable cap for the other end of the casing, a screw operative in said cap and extending into the casing when the cap is in place, a perforated disk secured to the inner end of said screw, and an inlet-pipe extending through said cap for the passage of the fluid to be filtered.

In witness whereof I have hereunto affixed my signature in the presence of the witnesses herein named.

ALBERT LIEBER.

Witnesses:
 EVANS WOOLLEN,
 MAMIE L. BASS.